(12) United States Patent
Wang et al.

(10) Patent No.: US 7,096,200 B2
(45) Date of Patent: *Aug. 22, 2006

(54) SYSTEM AND METHOD FOR EVALUATING AND ENHANCING SOURCE ANONYMITY FOR ENCRYPTED WEB TRAFFIC

(75) Inventors: Yi-Min Wang, Bellevue, WA (US); Qixiang Sun, Amarillo, TX (US); Daniel R. Simon, Redmond, WA (US); Wilfred Russell, Redmond, WA (US); Lili Qiu, Bellevue, WA (US); Venkata N. Padmanabhan, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 722 days.

This patent is subject to a terminal disclaimer.

(21) Appl. No.: 10/127,893

(22) Filed: Apr. 23, 2002

(65) Prior Publication Data
US 2003/0200175 A1    Oct. 23, 2003

(51) Int. Cl.
G06Q 99/00 (2006.01)
H04K 1/00 (2006.01)
H04L 9/00 (2006.01)

(52) U.S. Cl. .............................. 705/50; 705/1; 705/39; 705/40; 705/43; 705/44; 304/401; 380/25; 380/223

(58) Field of Classification Search .................. 705/50, 705/1, 39, 40, 43, 44; 304/401; 380/25, 380/223
See application file for complete search history.

(56) References Cited

FOREIGN PATENT DOCUMENTS

JP    2003030143    * 1/2003

OTHER PUBLICATIONS

MAXIM White paper 4, Glossary of 1-wire SHA-1 Terms ( )date, author unknown)☐☐.*

(Continued)

*Primary Examiner*—James Trammell
*Assistant Examiner*—John M. Winter
(74) *Attorney, Agent, or Firm*—Lee & Hayes PLLC

(57) ABSTRACT

A system and method is provided for evaluating the effectiveness of data encryption for hiding the identity of the source of Web traffic. A signature is constructed from encrypted Web traffic for a Web page sent by a target Web site, and the signature is compared with archived traffic signatures obtained by accessing various Web pages of interest in advance. If the signature of the detected encrypted Web traffic matches a stored traffic signature beyond a pre-set statistical threshold, a positive match is found, and the source of the traffic is identified. Countermeasures for reducing the reliability of source identification based on traffic signature matching are provided.

8 Claims, 15 Drawing Sheets

OTHER PUBLICATIONS

Chaum, David L., "Untraceable Electronic Mail, Return Addresses, And Digital Pseudonyms", *CACM*, Feb. 1981, vol. 24, No. 2, pp. 84-88.

Felton, Edward W. et al., "Timing Attacks on Web Privacy" *Proceedings of the 7th ACM Conference on Computer and Communications Security*, Nov. 2000, pp. 25-32.

Goldschlag, David M. et al. "Onion Routing for Anonymous and Private Internet Connections", *Communications of the ACM*, Feb. 1999, vol. 42, No. 2, pp. 39-41.

Haveliwala, Taher, "Scalable Techniques for Clustering the Web", 2000, http://dbpubs.stanford.edu/pub/2000-23 last printed Feb. 11, 2004.

Padmanabhan, V. N. et al. "An Investigation of Geographic Mapping Techniques for Internet Hosts", *Proceedings of acm sigcomm*, Oct. 2001, vol. 31, No. 4, pp. 173-185.

Raymond, Jean-Francois, "Traffic Analysis: Protocols, Attacks, Design Issues, and Open Problems", *Designing Privacy Enhancing Technologies: Proceedings/International Workshop on Design Issues in Anonymity and Unobservability*, Berkeley CA, Jul. 25-26, 2000, vol. 2009, pp. 10-29.

Reiter, Michael K. et al., "Crowds: Anonymity for Web Transactions", *ACM Transactions on Information and Systems Security*, Nov. 1998, vol. 1, No. 1, pp. 66-92.

Shields, Clay et al. "A Protocol for Anonymous Communication Over The Internet", *Proceeding of the 7th ACM Conference on Computer and Communications Security*, Nov. 2000, pp. 33-42.

Paulson, Tom, "It was a fishy way for a scientist to start wiring houses onto Web", *Seattle Post-Intelligencer new article*, Sep. 18, 2000, http://seattlep-i.nwsource.com/business/wang18.shtml.

Syverson, Paul F. et al., "Towards and Analysis of Onion Routing Security", *Designing Privacy Enhancing Technologies; Proceedings/International Workshop on Design Issues in Anonymity and Unobersrvability*, Berkeley, CA, Jul. 2000.

"Web Ad Blocking Under Linux/Unix, BeOS, MacOS and Windows" Last Update Feb. 20, 2000. http://ecst.csuchico.edu/~atman/spam/adblcok.shmtl.

"Government Is Wary of tackling Online Privacy" *New York Times Business Day*, Sep. 6, 2001.

"As Big PC Brother Watches, Users Encounter Frustration", *New York Times*, Sep. 5, 2001.

"Giving the Web a Memory Cost Its Users Privacy" *New York Times*, Apr. 9, 2001.

Wang, Yi Min, et al., "A Toolkit for Building Dependable and Extensible Home Networking Applications," in proceeding USENIX Windows Systems Symposium, Aug. 2000, pp. 101-112.

Fielding R. et al., Hypertext Transfer Protocol-HTTP/1.1, http://www.w3.org/Protocols/HTTP/1.1/rfc2616.pdf.

\* cited by examiner

SYSTEM AND METHOD FOR EVALUATING AND ENHANCING SOURCE ANONYMITY FOR ENCRYPTED WEB TRAFFIC

TECHNICAL FIELD OF THE INVENTION

This invention relates generally to communications over a computer network, and more particularly to the evaluation of the vulnerability of Web traffic to attempts to identify the sources of the Web traffic, and to the provision of effective countermeasures against such privacy attacks.

BACKGROUND OF THE INVENTION

Protecting communication privacy is an important issue for all types of electronic communication, especially when the communication data are sent over a large network, such as the Internet, where an adverse party can easily intercept the communication data. The recent rise of the World Wide Web on the Internet has triggered serious concerns about the possible threats to privacy associated with Web browsing. The browsing user's location or other types of personal information may be inadvertently disclosed if the communication data traffic is intercepted by an adverse observer. Even partial revelation of such information can cause embarrassment and/or financial detriments or even compromise safety.

One particular type of browsing-related sensitive information to be protected is the fact that the browsing user is accessing a particular Web site or Web page. For instance, a user found to be browsing Web pages containing certain types of medical or financial information may inadvertently reveal, through implied interest in that information, embarrassing or confidential financial information about himself. As another example, a user may reveal that he is out of town, thereby making his home vulnerable to burglary, simply by accessing a private home security Web server from abroad. An adverse observer need only notice that the home security Web server is being accessed, and that the originating IP address of the HTTP request is not in the same locale as the home/server, which is usually an easy thing to determine by one skilled in sniffing Internet traffic. An inference can thus be made that the resident (the most likely browsing user of the private Web server) will not return home soon.

To protect the privacy of Web browsing, a considerable amount of research has been directed at developing techniques for "anonymizing" Web browsing traffic so as to hide the connection between a particular user and the Web pages he or she is accessing. Conventionally, most proposed measures for protecting Web traffic anonymity have focused on two main tools: data encryption and the use of one or more intermediate proxies. Data encryption is applied to communication data to hide information that might reveal either the identity of the user or the content of the Web page. Intermediate proxies are used to hide from any particular routing node or an eavesdropper on the network the connection between the browsing user's network address and the Web site's address.

Even with the combination of data encryption and using intermediate proxies, Web traffic anonymity is still not guaranteed. Generally, even when multiple proxies are used, the first link on the routing chain (i.e., the link between the user and the first proxy) is the most vulnerable to attack, since an attacker (which may be the first proxy itself, the user's ISP, or perhaps an eavesdropper, especially on a wireless link) can immediately determine the user's network address. To prevent privacy attacks in such a case, data encryption is essential.

A critical question is, however, how effective the encryption of Web traffic is for hiding the source (e.g., a Web site) of the traffic from the attacker. Prior to the present invention, there has been no meaningful way to evaluate whether the encrypted Web traffic is vulnerable to privacy attacks that attempt to identify the source of the Web traffic. A related question, which can only be answered based on an understanding of the answer to the first question, is which countermeasures may be effectively used to make it more difficult for an adverse party from reliably identifying the source of the encrypted Web traffic. These questions remained largely unanswered until the present invention.

SUMMARY OF THE INVENTION

In view of the foregoing, the present invention provides a system and method for evaluating the vulnerability of Web traffic to attacks that attempt to identify the source of the Web traffic, and provides effective countermeasures to such attacks. In particular, the invention provides a way to evaluate, based on real statistical data, whether encrypted Web traffic from certain Web sites of interest can be used to reliably identify the sources of the traffic. The evaluation is performed by an evaluation server that resides between a client and a target Web site to intercept encrypted traffic for Web pages sent by the target Web site. The evaluation server maintains a traffic signature database for storing traffic signatures of Web pages obtained previously by accessing those pages. When the evaluation server receives encrypted Web traffic from the target server, it compares the signature of that traffic with the stored signatures in the signature database. If the signature of the detected Web traffic matches a stored signature beyond a pre-set statistical threshold, a positive match is found. The reliability of the match is assessed by determining whether false-positives are found in a sample group of Web sites.

The present invention also provides various ways to make it more difficult to identify the source of the encrypted Web traffic based on statistical matching of traffic signatures of the encrypted Web traffic. The countermeasures generally include three types of traffic-shaping schemes: padding, mimicking, and morphing. In particular, countermeasures including exponential padding of object sizes, padding by adding objects, mimicking other Web pages, random blocking of Web advertisement objects, and using multiple browsers to fetch randomly selected Web pages at the same time to mix objects of various Web pages in the traffic, can be used to modify the pattern of encrypted Web traffic for a Web page to reduce the uniqueness of the traffic signature.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Figure 1:
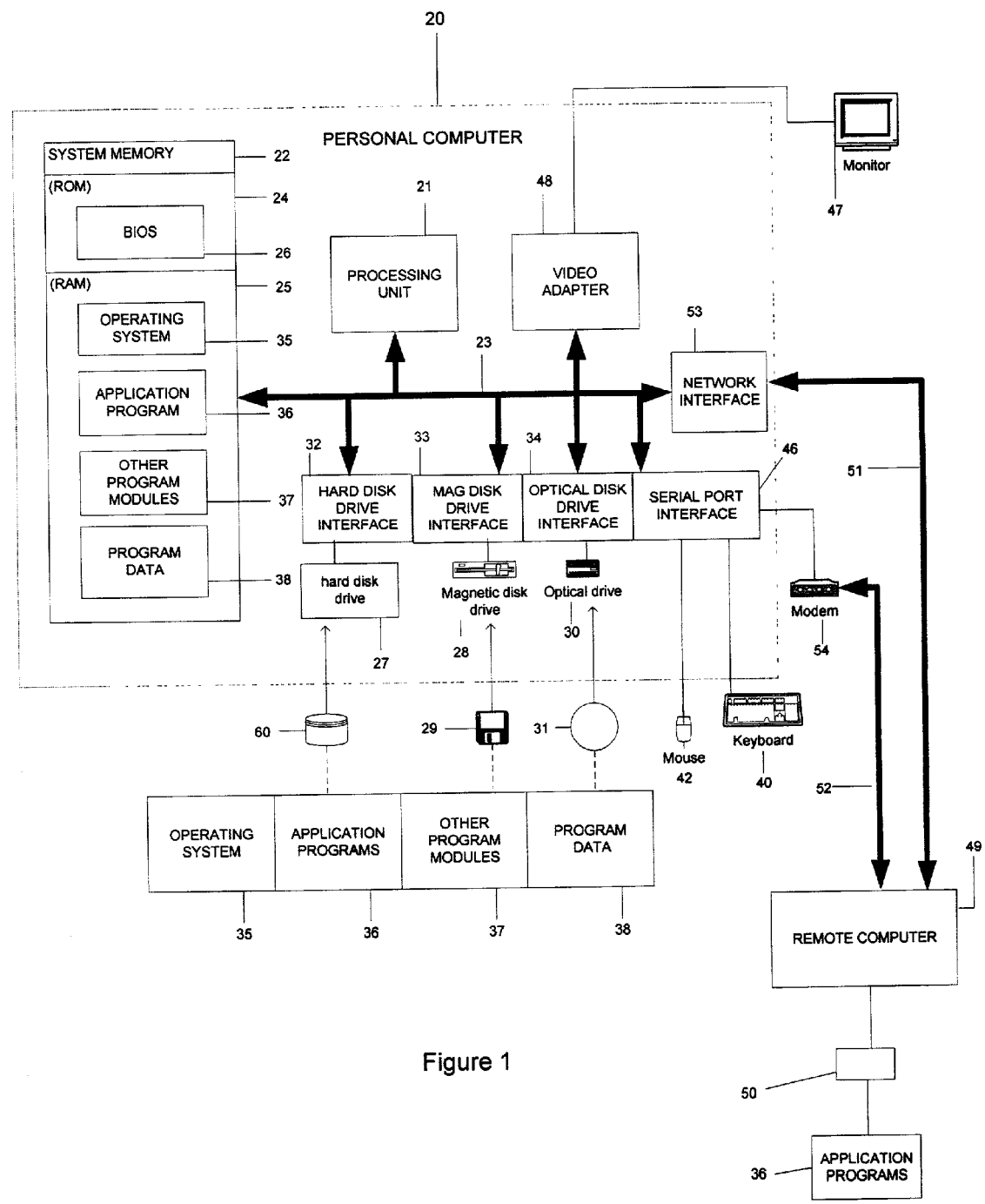
FIG. 1 is a block diagram generally illustrating an exemplary computer that may be used for implementing components of a system according to the present invention for evaluating the protection of source anonymity associated with encrypted Web traffic.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers, and the like. The invention may be practiced in distributed computing environments where tasks are performed by remote processing devices that are linked through a communications network. In a distributed computing environment, program modules may be located in both local and remote memory storage devices.

The following description begins with a description of a general-purpose computing device that may be used in a system for implementing the invention, and the invention will be described in greater detail with reference to FIGS. 2–13. Turning now to FIG. 1, a general purpose computing device is shown in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the personal computer 20, such as during start-up, is stored in ROM 24. The personal computer 20 further includes a hard disk drive 27 for reading from and writing to a hard disk 60, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the personal computer 20. Although the exemplary environment described herein employs a hard disk 60, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, storage area networks, and the like may also be used in the exemplary operating environment.

A number of program modules may be stored on the hard disk 60, magnetic disk 29, optical disk 31, ROM 24 or RAM 25, including an operating system 35, one or more applications programs 36, other program modules 37, and program data 38. A user may enter commands and information into the personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB) or a network interface card. A monitor 47 or other type of display device is also connected to the system bus 23 via an interface, such as a video adapter 48. In addition to the monitor, personal computers typically include other peripheral output devices, not shown, such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and, inter alia, the Internet. When used in a LAN networking environment, the personal computer 20 is connected to the local network 51 through a network interface or adapter 53. When used in a WAN networking environment, the personal computer 20 typically includes a modem 54 or other means for establishing communications over the WAN 52. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operations described hereinafter may also be implemented in hardware.

Figure 2:
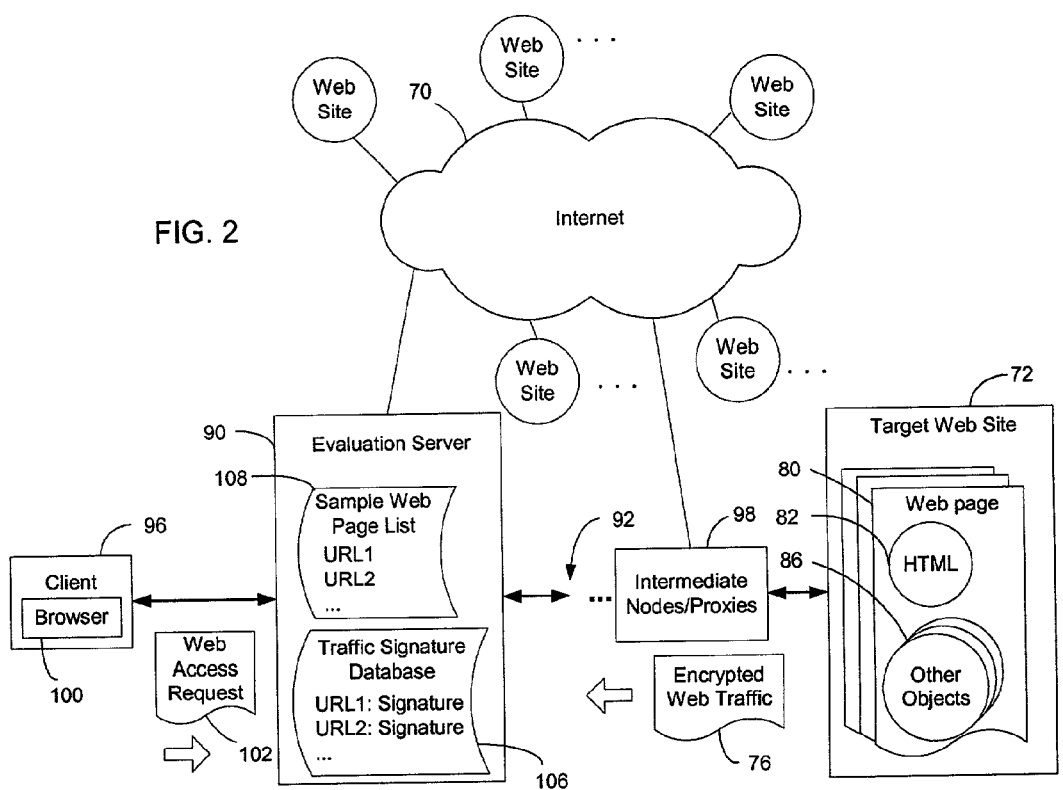
FIG. 2 is a schematic diagram showing an evaluation server disposed to receive encrypted Web traffic sent by a target Web site to determine whether the identity of the target Web site can be positively identified from a signature of the encrypted Web traffic.

Turning now to FIG. 2, the present invention is directed to a new approach to evaluating the vulnerability of encrypted network traffic to attempts by adverse parties to trace the source of the traffic. In particular, the invention provides a way to answer, based on real statistical data, the question of whether encrypted Web traffic from certain Web sites of interest on the Internet 70 can be used to reliably identify the sources of the traffic, even when the traffic is encrypted. In other words, the invention can be used to show, for any given Web site 72, how effectively data encryption hides the source identity for the Web traffic 76 transmitted by that Web site. As used herein, the term "Web traffic" means the communication data sent by a Web server in response to a request by an Internet client to access a Web page or the like. Typically, the Web traffic for a Web page 82 includes the HTML document 82 defining the Web page, and objects 86 included in the page, such as graphic objects and applets. The encrypted Web traffic is typically transmitted under the Hyptertext Transport Protocol (HTTP), with the objects in the page transmitted either as separate data blocks or combined into larger data blocks.

As described in greater detail below, the present invention shows that encrypted Web traffic in many cases can be used to identify its source, with a high degree of success rate, by matching the pattern (or "signature") of the Web traffic with known traffic patterns of Web sites. The invention thus provides a meaningful way to statistically evaluate the vulnerability of Web traffic of a target Web site to privacy attacks that attempt to discover who is the originator of the traffic. Based on the insight provided by the traffic analysis regarding the identifiability of the sources of Web traffic, the present invention also suggests various countermeasures that can be used to modify the traffic patterns to make it more difficult for an adverse party to identify the source of the traffic by means of traffic pattern matching.

In the embodiment shown in FIG. 2, the anonymity evaluation according to the invention is performed by an evaluation server 90. The evaluation server is located in a routing path 90 between a client 96 and the target Web server 80 to receive encrypted Web traffic 76 sent by the Web server to the client. In a preferred embodiment, the evaluation server is the first hop from a client on the routing path. The routing path typically includes other intermediate nodes/proxies 98. The client 96 has a browser 100 that sends Web access requests 102 to the Web server for Web pages maintained by the Web server.

In accordance with the invention, the evaluation server 90 intercepts encrypted Web traffic (which could be from any Web site on the Internet) passing through it and analyzes the pattern or signature of the encrypted traffic, and determines whether there is a good match between the observed traffic pattern and one of the pre-recorded traffic signatures for different Web pages. The pre-recorded traffic signatures are stored in a traffic signature database 106 and correspond to a plurality of target Web pages in a sampling pool. The URLs of the Web pages in the sampling pool are stored in a target page list 108.

When the browser 96 fetches a Web page 80, it issues an HTTP "GET" request to the address indicated by the page's URL, and receives in response an HTML "object" which may in turn contain references to other Web objects. These objects are then fetched in turn synchronously (although in parallel on multiple TCP connections, so as to speed the process and prevent a single failed "GET" from delaying the downloading of the rest of the page). Thus, a given Web page results ultimately in the downloading of a certain (fixed or variable) number of objects in a possibly variable order. Each of these objects in turn may have either fixed or variable length, which depends on whether a padding scheme is used. Generally, when a user is accessing one Web page at a time, there is a time gap between the downloading of objects of two consecutively accessed pages, and it can be assumed that all objects in the traffic belonging to the same Web page will form a distinctive batch. For purposes of the invention, it is assumed that both the outgoing HTTP requests and returned objects are strongly encrypted, revealing no identifying information that directly reveals the identify of the Web site that sends the traffic representing the Web page.

It is further assumed that the IP address of the recipient or responder to the "GET" request is merely a proxy server whose identity provides no information about the real source of the Web page. For example, the browser 100 may have established an SSL connection to the proxy server, and be forwarding (encrypted) HTTP requests to the proxy over that connection. In this case, the requests are protected by the encryption on the SSL channel, but the sizes of the returned objects are clearly discernible (to within the cipher's block size, if a block cipher is used). Alternatively, the HTTP requests generated by the browser, and the corresponding responses received by it, may be intercepted by a more sophisticated intermediate layer on the local machine of the client that implements its own encryption protocol, possibly including large amounts of data "padding" (particularly of returned HTTP objects) to disguise their true lengths.

Moreover, it is also assumed that object caching has been disabled, to guard against timing attacks by servers as described below. Normally, a browser caches recently fetched objects to speed the presentation of pages containing these objects. However, it has been shown that in this case any server, by including a request for an object from a particular site in its Web page (e.g., between requests for two objects from the server itself), and measuring the delay introduced by this fetch, can determine with high fidelity whether the included object was cached, and thus whether the browsing user had previously visited that site. As a result, if the user turns on object caching, she'll be vulnerable to the timing attack described above. It is therefore assumed, for purposes of the evaluation, that the user will turn off object caching.

Basically, the task of the evaluation server 90 is to find out whether it can reliably (in a statistical sense) identify the sources of encrypted Web traffic passing through it (or intercepted in any way) by examining the particular pattern or "signature" of the Web traffic. To that end, it monitors the encrypted traffic and searches for examples of access to one of a set of Web pages. For example, the evaluation server may be searching for pages from Web sites of a sensitive nature, or those that implicitly reveal information about the browsing user.

To allow a correlation between an observed traffic pattern and a Web site as the possible source of the traffic to be established, the evaluation server maintains the signature database 106 to store up-to-date traffic signatures for the Web pages of interest (also called the "target pages"). The traffic signature for a given Web page may include, for example, the number of objects in that Web page and the sizes (or lengths) of the respective objects.

The evaluation server 90 generally is not required to identify an example of access to a particular "interesting" page with 100% accuracy. Too much "noise" among detected access instances, however, would render the observations useless to anyone trying to exploit them. The evaluation server compiles traffic information on particular Web pages of interest, collects traffic from potential viewers of those pages, and evaluates the similarity of the traffic patterns to attempt to determine if a particular viewer is viewing one of the "target pages". Although contextual information (such as the viewer's past history of traffic) may be used, in the simplest case only the traffic patterns themselves are compared.

Depending on the particular nature of Web sites being studied, different rates of false positives and false negatives may be acceptable. In most scenarios, however, whether the matching by means of traffic analysis is considered to be successful or not will be most severely affected by the false positive rate for several reasons. First, browsing users tend to revisit sites multiple times, fetching multiple pages, and usually one identification of a targeted access is enough, hence high false negative rates are not much of an obstacle. Second, since the overwhelming majority of browsing traffic is likely to be uninteresting, even a fairly small false positive rate can result in huge numbers of false positives in absolute terms. Third, since false positives are unlikely to disappear entirely, positive reports may require significant extra analysis to verify (such as examining contextual information to determine the plausibility of the detected traffic). Hence reducing this overhead can be expected to be a high priority. Thus, it may be assumed that the goal is to identify Web pages with as low a false positive rate as possible, while still achieving a significant rate of true positive identifications.

Figure 3:
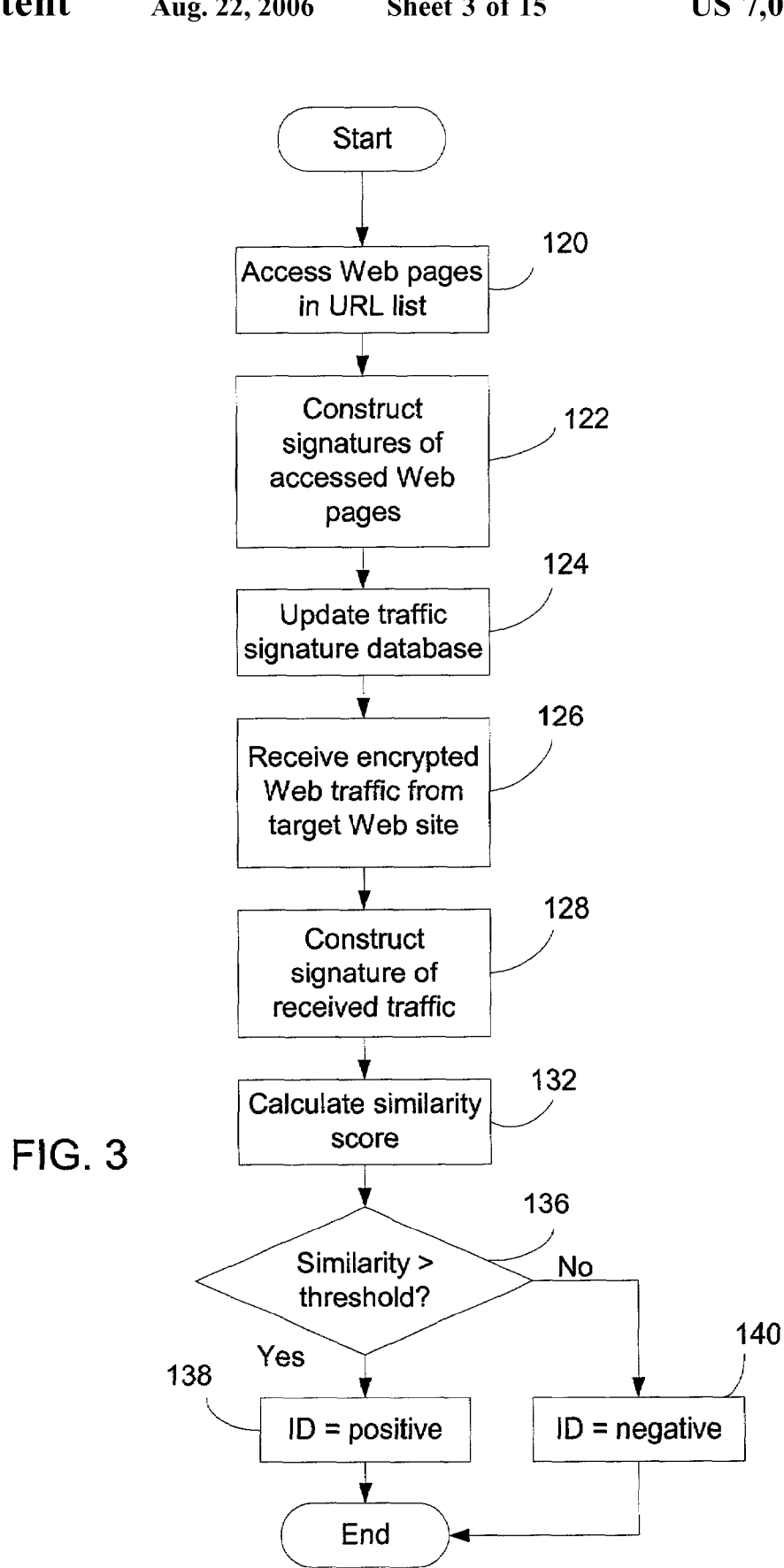
FIG. 3 is a flow diagram summarizing the operation of the evaluation server for source identification.

The operation of the evaluation server 90 is summarized in FIG. 3. From time to time, the evaluation server 90 is programmed to access the Web pages identified by the URLs stored in the list 108 of Web pages (step 120). For each Web page it accesses, the evaluation server constructs the signature of Web traffic associated with that page (step 122), and updates the signature database to store that traffic signature (step 124). During the evaluation operation, the evaluation server intercepts encrypted Web traffic for a Web page that passes through it (step 126), and construct the signature of the Web traffic based on the observed traffic pattern of that Web page (step 128). It then compares this "detected" traffic signature with the traffic signatures stored in the traffic signature database to see whether a positive match is found. As described in greater detail below, in one embodiment the comparison includes performing a similarity score calculation (step 132), and determining whether the similarity score meets a pre-set threshold criterion (step 136). If the similarity score exceeds the threshold, a positive match is found; otherwise a negative match is found. A positive match means that the evaluation server has found a Web page whose archived traffic signature in the database 106 is sufficiently close to the detected signature such that the source of the detected Web traffic is likely to be the Web site hosting that Web page. In a controlled study, the evaluation server knows the actual identity of the Web page and thus can tell whether the Web traffic indeed corresponds to that Web page or, conversely, a false positive is found.

At the outset, it will be appreciated that the type of traffic analysis performed by an evaluation server is what a hacker or adverse party may try to do to identify the sources of encrypted Web traffic, now that the present invention has demonstrated the effectiveness of such analysis for source identification. The anonymity evaluation performed by the evaluation server according to the invention can be used as a prophylactic measure for a target Web site to assess how well its anonymity is protected by encrypting its Web traffic. The evaluation server can provide a clear answer by performing a "real-world" study to see how reliably the signature of the encrypted traffic for the Web pages of that Web site can be recognized. Thus, the evaluation server provides a valuable service to the Web sites because it provides actual quantitative results of how easily or difficult the encrypted Web traffic sent by any given Web site can be traced to that Web site by an adverse party. The results of the statistical analyses performed by the evaluation server can then be used to shed light on different ways to reduce the "uniqueness" of the Web traffic signatures to reduce the reliability of source identification based on traffic signature analysis.

To demonstrate the effectiveness of source identification based on a statistical comparison of traffic signatures of encrypted Web traffic, the procedure of an actual study and its results are described below. In that particular study, traffic signature information is collected on a sample of just under 100,000 Web pages, from a wide range of different sites. The pages were obtained from the DMOZ Open Directory Project link database (http://dmoz.org), half of them chosen from various categories of "sensitive" site to which an adversary might be interested in spotting visitors, and the other half chosen randomly.

The traffic pattern information examined in the study simply consisted of the number and sizes of the (unordered) set of objects fetched by a browser (Microsoft Internet Explorer version 5.5) accessing that page. The objects' number and sizes were determined solely by observing the chunks of response data (blocks of packets) received by the browser between blocks of request packets emanating from the browser in a trace of the browser's TCP connections. Thus, no information was used that would have been obscured had the data passed across the connections been encrypted.

Of those Web pages in the sample, there is a small subset of just over 2000 "target pages" from two particular subcategories of the "medical information" category). These target pages were visited in advance by the evaluation server to collect a "signature database" (such as the database 106 in FIG. 2), before visiting the entire sample group (including non-target pages). A simple scalar "closeness" metric Sim $(s_1, s_2)$ for measuring the similarity between two signatures, to be used to determine how well each given signature matched one of those in the sample. Viewing the pages as multisets of object lengths, the coefficient (Sim(X,Y)= $|X \cap Y|/|X \cup Y|$) was chosen as the metric for indicating the quality of the match, using the standard definitions of multi-set intersection and union-minimum number of repetitions for intersection, maximum for union.

For purposes of understanding the results of the analysis, the following categories are defined for pages in the sample and "target" subsample used in the study:

(1) Identifiable page: given a set T of target pages and a page t∈T (identified as t' when fetched a second time), t is an identifiable page with respect to T if (1) ∀u≠t∈T, Sim(t', t)>Sim(t', u) and (2) Sim(t', t)≧c, where c is the similarity threshold for Sim. That is, an identifiable page in the subsample is one that the metric correctly matches with its incarnation in the subsample when revisited. This definition excludes pages that either are too similar to any others in the same subsample or vary too much in traffic signature between different accesses. If S⊆T is the set of identifiable pages in the subsample, then the identification rate of T is |S|/|T|*100%.

(2) Potential false positive: given a target page t and a non-target page n, n is a potential false positive of t if Sim(n, t)≧c, where c is the similarity threshold for Sim. Put simply, a potential false positive is a non-target page that the similarity measure and threshold scheme might possibly identify as a target page. Note that the definition of a potential false positive is independent of the rest of the subsample. It allows us to compute an upper bound on the number of actual false positives without considering all possible sets of target pages. The actual number of false positives is smaller, as the following definition explains.

(3) Actual false positive: given a subsample of target pages T and a non-target page n∉T in the larger sample, n is an actual false positive with respect to T if (1) ∃t∈T for which n is a potential false positive of t, and (2) Sim (n, t)>Sim(n, u) for all u≠t∈T. In other words, a potential false positive n will not result in an actual false-positive decision if n is a potential false positive for more than one target page and the similarity scores are tied (since a detection algorithm tuned to minimize false positives will refuse to identify n as either one of the two plausible candidate target pages). For the set N of non-target pages, if F⊆N is the set of actual false positives with respect to T, then the actual false positive rate of N with respect to T is |F|/|N|*100%.

(4) K-identifiable page: given a set of target pages T and a set of non-target pages N, a page t∈T is a K-identifiable page with respect to T and N if (1) t is an identifiable page with respect to T, and (2) for P⊆N consisting of all n∈N that are potential false positives of t, |P|≦K. That is, a K-identifiable page is an identifiable page from the subsample that generates at most K potential false positives in the overall sample Thus, a uniquely identifiable page is "0-identifiable", generating no false positives in the overall sample. Given T and N, if S⊆T is the set of K-identifiable pages in the subsample, then the K-identifiability rate of T with respect to N is |S|/|T|*100%.

For the reasons explained earlier, the general goal was to determine if a threshold exists that allows a significant fraction of target pages to be identified while maintaining very low false positive rates. Naturally, the unique identification rate would depend on such factors as the amount and method of padding used in the encryption, and the variability of the pages; determining how much each of these factors affected the unique identification rate was also a goal.

Figure 4:
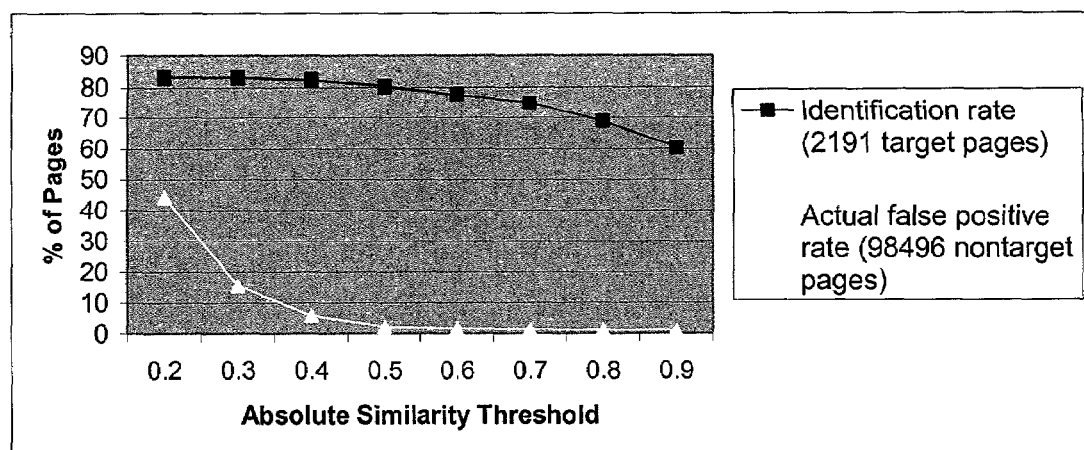
FIG. 4 is a chart representing results of a study according to the invention and showing how an identification rate and a false-positive rate vary with a similarity threshold used in matching signatures of encrypted Web traffic.

Results of the Study:

Turning now to the results of the study, FIG. 4 shows the rate of identifiable pages for the target pages and the actual false positives as a function of the threshold used in the similarity metric. Here a false positive means that a non-target Web page is found to have a signature that is sufficiently similar (i.e., the similarity is greater than the threshold) to one of the target Web pages. It is clear that for a substantial intermediate range of threshold values, a high identification rate coincides with an extremely low false positive rate. In particular, a threshold of 0.7 gives an identification rate of about 75%, and a false positive rate of less than 1.5%; that is, less than 1.5% of pages outside the target set in the larger sample were incorrectly identified as a target page from the subsample.

Figure 5:
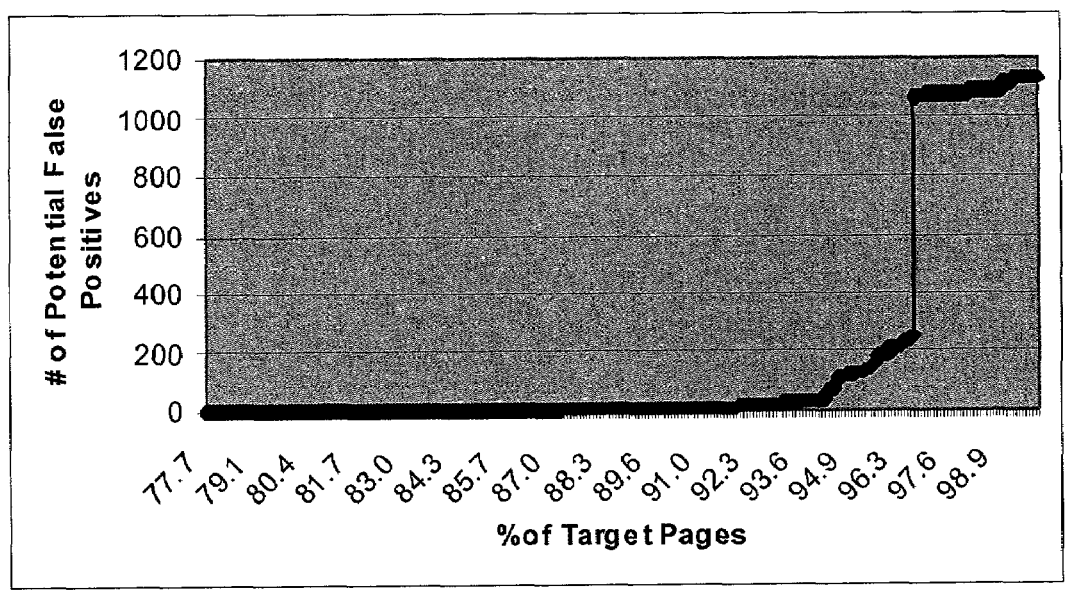
FIG. 5 is a chart representing results of a study according to the invention and showing a distribution of the number of potential false positives among target Web pages.

Even though this false positive rate is relatively low, it masks the disproportionately large effect of a small subset of the target pages. As FIG. 5 shows, a significant fraction of target pages that generate potential false positives in this case generate a large number of them; these "generic-looking" pages appear to generate the bulk of potential false positives. It should be noted that many of these might not generate actual false positives; that is, since they may match multiple target pages equally, they could easily be discarded as unlikely true positives. For example, various types of error messages, which tend to fall into a few standard classes, produced the high plateau on the right edge of FIG. 5's Cumulative Distribution Function (CDF) graph. These are not necessarily easily distinguishable from normal pages. They may, for instance, be generated and formatted by the Web server and returned as normal pages. Meanwhile, over 77% of pages did not even generate a single false positive from the overall sample. This latter statistic thus appears to be a more relevant measure of the feasibility of identifying Web traffic than the fraction of the overall sample that would be a false positive for some member of the target set. This is because an attacker, by omitting generic-looking pages, could expect to identify the remaining target pages with an extremely low false positive rate.

Figure 6:
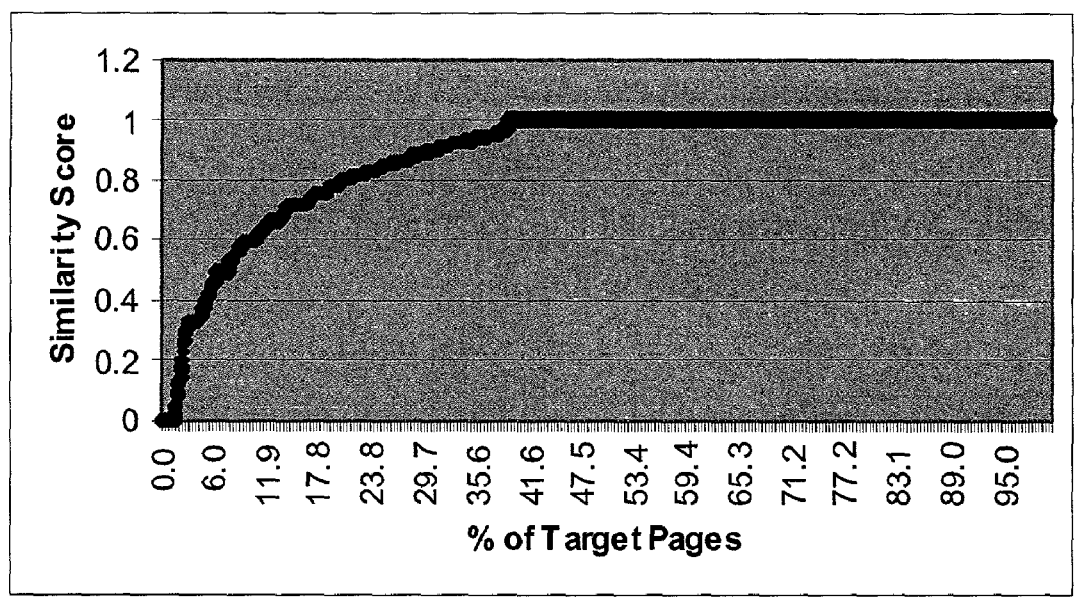
FIG. 6 is a chart representing results of a study according to the invention and showing how similarity scores for two consecutive accesses of a same Web page vary with different target Web pages included in the study.

On the other hand, some pages, regardless of the number of false positives they generate, are in practical terms non-identifiable by virtue of their highly dynamic nature. FIG. 6 shows how pages vary between accesses. Just under 40% do not match exactly even when re-accessed immediately, and about 14% do not even achieve a similarity score of 0.7. In a smaller sample of 20,000 pages not shown here, it has been found that the difference between immediate and day-to-day changes is fairly small, indicating that pages can be roughly categorized as stable or variable between accesses, without regard to the exact time interval between the accesses. Since the target set is assumed to be relatively small, the evaluation server (and also an attacker) can be assumed able to update its signature database at least daily.

Accordingly, the following discussion will concentrate on rates of unique identifiability (defined as meeting the similarity threshold, with no false positives) of the target set against the entire 100,000-page sample as the chief measure of the success of the identification method according to the invention. It is also examined how various countermeasures affect this unique identifiability rate, as well as the k-identifiability rate for very small values of k. These figures provide indications as to the "noise" levels that an adverse party attempting the traffic signature-based source identification would face when trying to detect encrypted browsing of a chosen target set of Web pages.

Countermeasures

Having demonstrated the effectiveness of traffic analysis in accordance with the invention for identifying the sources of typical encrypted Web traffic, the following description focuses on several traffic-shaping mechanisms that may be used to make an attackers' job more difficult. All of these countermeasures require varying degrees of additional effort by the Web server and/or client software to protect the anonymity of sources. They can be classified into three general categories: padding, mimicking, and morphing.

A. Padding

Padding is often cited in the literature as a means to disguise traffic volume. Typically it is used to create uniform-looking blocks of data out of blocks of varying (and thus distinguishable) sizes. An object of an original size is padded with redundant data to increase the size of the padded object to the next larger standard size. One known implementation of "onion routing", for instance, transmits 128-byte blocks of data, padding blocks if necessary to prevent blocks from being distinguishable based on length. In the case of transmissions larger than the block size, the only information revealed about the length is the nearest larger multiple of the block size.

Figure 7:
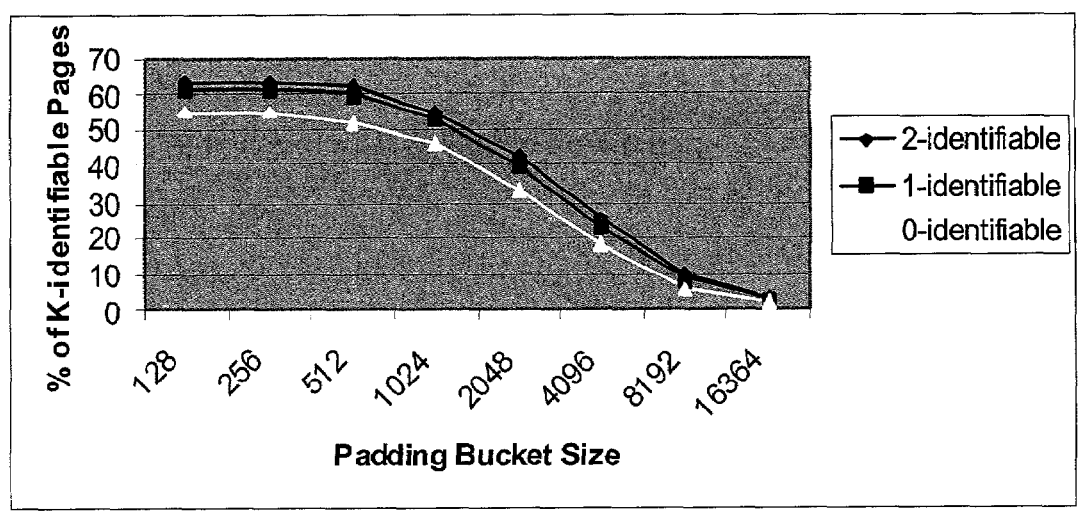
FIG. 7 is a chart representing results of a study according to the invention and showing how a K-identifiability rate changes with a bucket size of linear padding applied to objects in encrypted Web traffic.

Although padding schemes can help, they are far less effective than one might assume, particularly in cases such as Web browsing traffic, where a collection of associated padded lengths can be analyzed. FIG. 7 shows the results of how a standard linear padding scheme reduces the fraction of uniquely identifiable pages in the subsample. In each case the similarity threshold is varied to optimize the fraction of uniquely identifiable pages, as well as the fraction of "nearly uniquely identifiable" pages (1- and 2-identifiable pages). A 128-byte scheme was shown to be a very weak countermeasure; over half the pages in the subsample remained uniquely identifiable. Rounding object sizes up to multiples of four kilobytes (effectively nearly doubling transmission overhead, based on a median object size of 2.5 Kbytes) still allowed unique identification of nearly 18% of pages. In both cases, a further 8% of pages were nearly uniquely identifiable. It took a minimum object size of between 8 and 16 kilobytes to reduce the fraction of uniquely identifiable pages below 5%.

Figure 8:
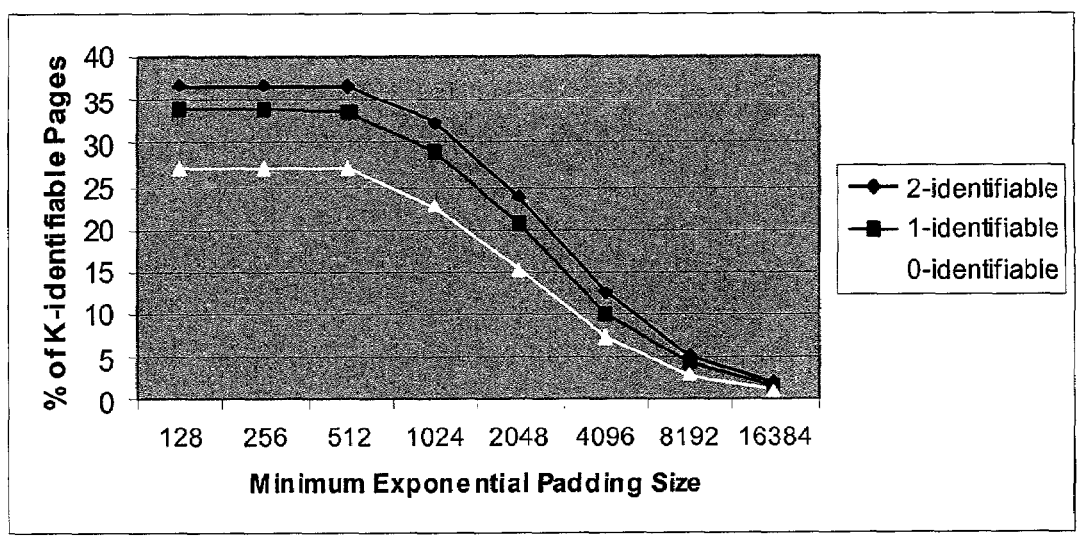
FIG. 8 is a chart representing results of a study according to the invention and showing how the K-identifiability rate changes with a minimum size of exponential padding applied to objects in encrypted Web traffic.

Of course, a 0% false positive rate for the sample does not imply a 0% false positive rate for the World Wide Web as a whole. On the other hand, a false positive rate of 0% is not considered to be necessary for effective identification to occur. It is assumed that an adversary can apply more careful (and expensive) scrutiny of traffic to further eliminate false positives, as long as an efficient automated screening method exists to allow the extra processing to be limited to a relatively tiny fraction of observed traffic. Such processing might involve correlation with various kinds of contextual information, such as the signatures of prior and subsequent pages, the browser's IP address, time of day, etc. It appears that a significant number of pages are indeed amenable to such screening, with very low (if ultimately non-zero) false positive rates An alternative padding method is called the "exponential padding," in which objects are padded out to a number of bytes which is a power of 2 (or another integer) rather than a multiple of a fixed size. The exponential size padding works somewhat better than the standard ("linear") method. As FIG. 8 shows, exponential padding with a 128-byte minimum block size reduces the unique identifiability rate to 27%, with a further 9.5% being nearly uniquely identifiable. A 5% unique identifiability rate requires somewhere between a 4- and 8-Kilobyte minimum block size. Exponential padding can be much more expensive than linear padding, since even large objects can be as much as doubled in length.

Figure 9:
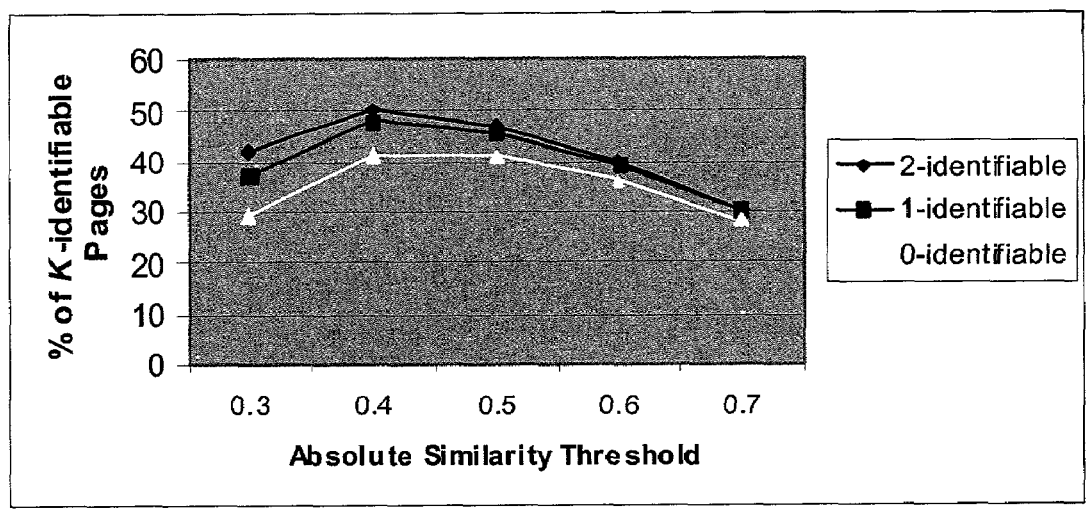
FIG. 9 is a chart representing results of a study according to the invention and showing how a K-identifiability rate varies with the absolute similarity threshold when a number-of-object padding scheme is used as a countermeasure.
Figure 10:
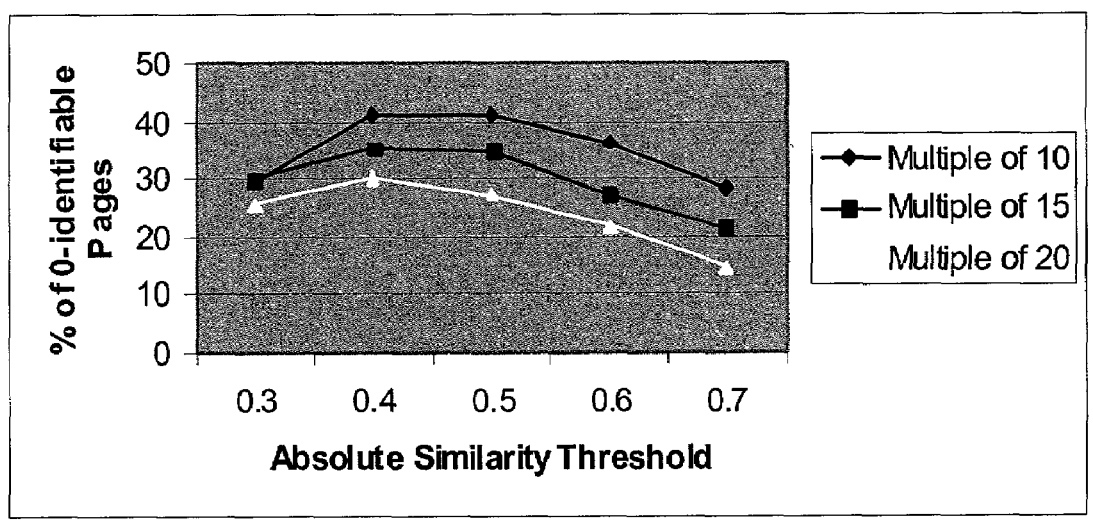
FIG. 10 is a chart representing results of a study according to the invention and showing the variations of a zero-identifiability rate for different random object padding applied to encrypted Web traffic.

Another possible padding method is to add extraneous objects of arbitrary length to the page. This technique has modest success against the similarity measure. As FIG. 9 shows, the presence of randomly sized extraneous objects depresses similarity scores for true positives, requiring the decision module to accept (and thus to be able to distinguish from others) pages with relatively low similarity scores. However, even when the similarity threshold is reduced to take this effect into account, the measure still generated no false positives for over 40% of target pages, and one or two false positives for a further 8.5%, when extraneous objects of random size up to 10 Kbytes were added to bring the total number of objects to a multiple of 10. Increasing the padding factor didn't help that much, as shown in FIG. 10. When pages were padded to a multiple of 20 objects, the unique identifiability rate was still over 30%.

Figure 11:
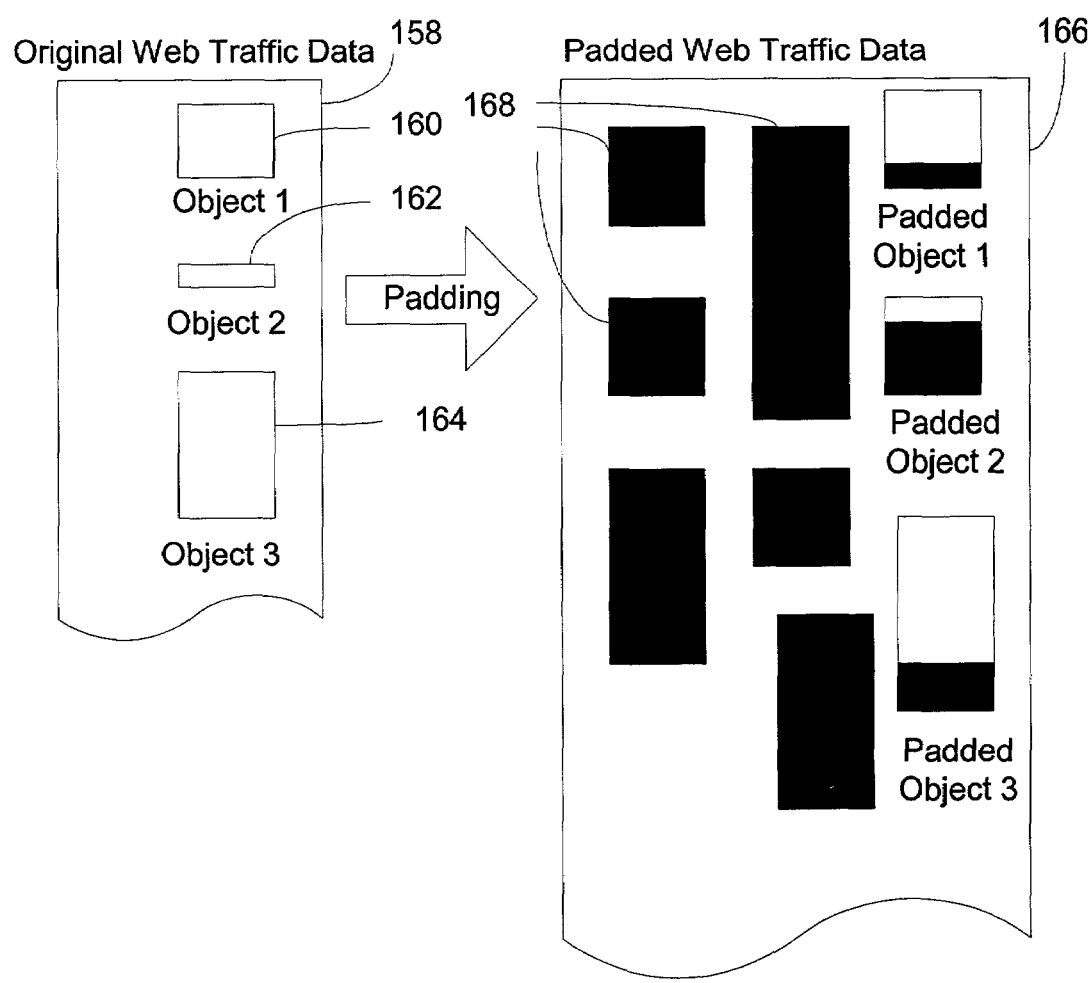
FIG. 11 is a schematic diagram showing traffic data for a Web page with objects padded to standard sizes and with the addition of extraneous objects.

However, additional experiments showed that combining extraneous objects with aggressive object-size padding (to a multiple of 2 Kbytes) was quite effective. By way of example, as shown in FIG. 11, the traffic data 158 for a Web page that contains 3 objects 160, 162, 164 are added with six extraneous objects 168 so that a total of 9 objects are included in the padded traffic data 166 sent out by the Web server. Moreover, each object is padded with redundant data (represented by dark regions in the padded objects) to the nearest multiple of 2 Kbytes. Using the optimal similarity threshold, only 3.8% of doubly padded pages were uniquely identifiable, with a further 2% generating one or two false positives. Again, though, such a combined padding scheme can be quite inefficient. For example, a "median page" of 11 objects each of length 2.5 Kbytes would be nearly tripled in total length.

B. Mimicking

Another approach is to find patterns of Web traffic that are common to many different Web pages, and try to tailor one's Web pages in order to hide among them. For example, popular Web hosting services often provide standard templates for Web pages whose profiles can be mimicked. Alternatively, a Web page's content could be tailored to mimic particular widely accessed pages, in order to guarantee numerous false positives. Home pages of particular popular Web sites are obvious candidates.

Figure 12:
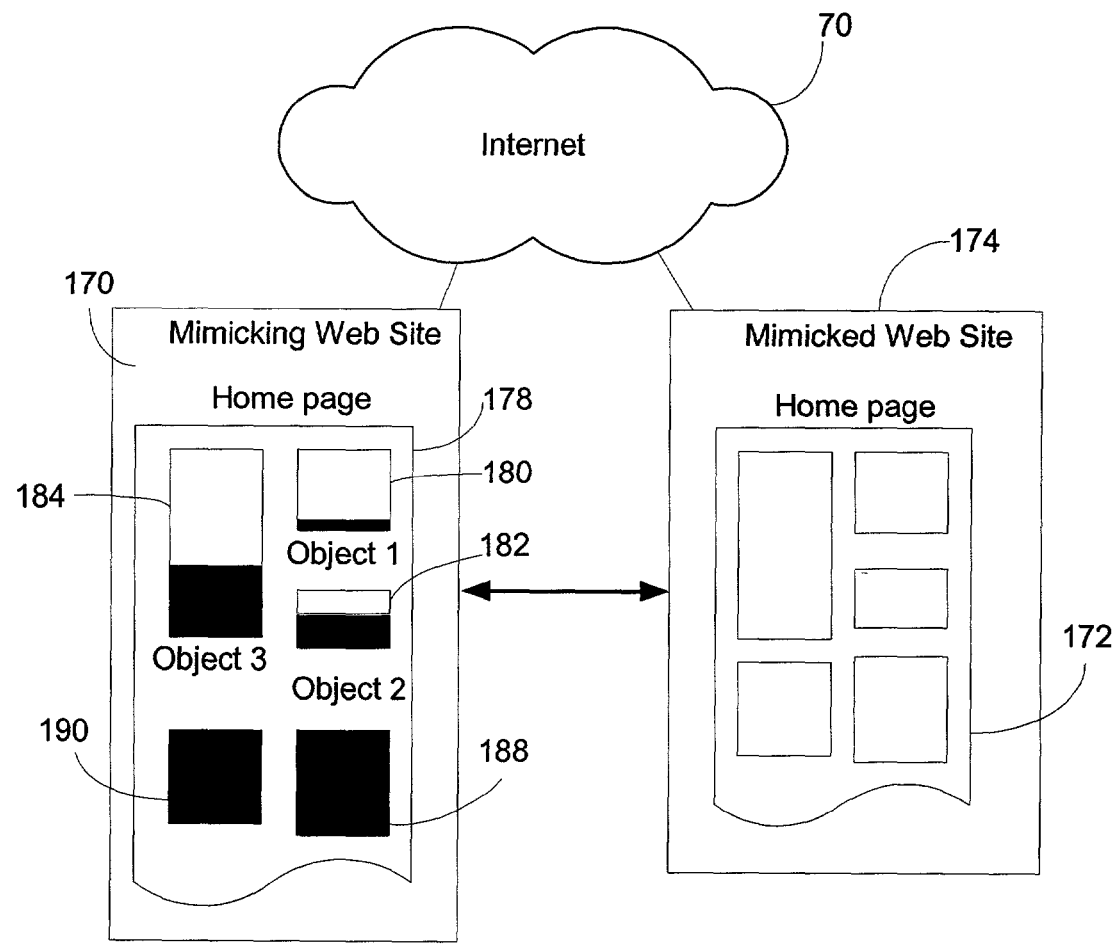
FIG. 12 is a schematic diagram showing a Web site that has a home page mimicking the home page of another Web site.
Figure 13:
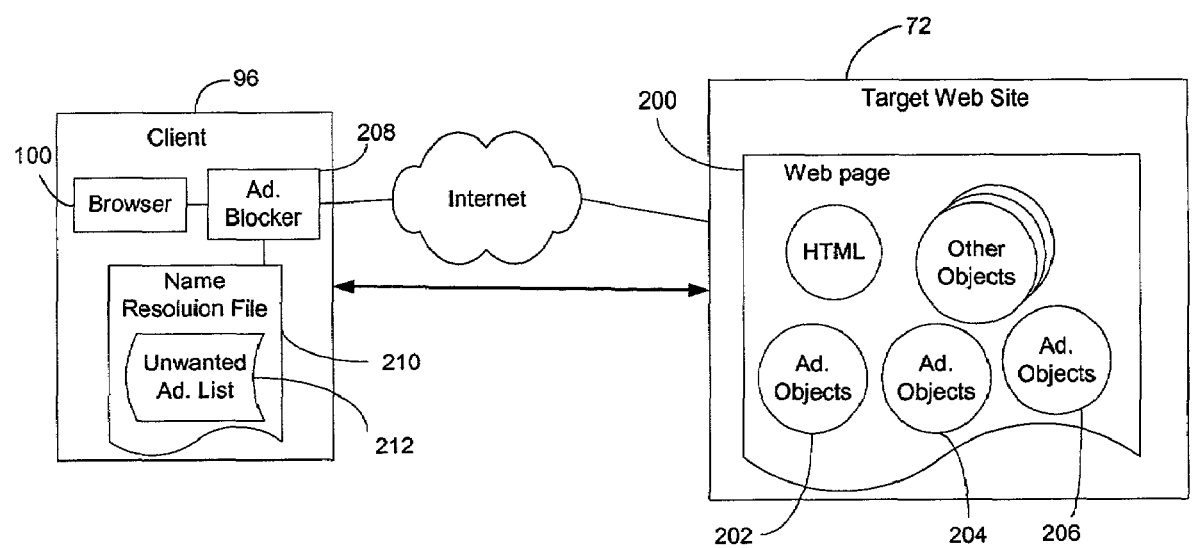
FIG. 13 is a schematic diagram illustrating a scheme of randomly blocking the downloading of advertisement objects in a Web page.

By way of example, referring to FIG. 12, a Web site 170 may try to tailor its home page 178, which contains 3 objects 180, 182, 184, to mimic the home page of a popular Web site 172, which contains 5 objects of different sizes. To that end, the Web site 170 uses its browser to access the Web site 174 it wants to mimic to obtain the objects in the home page 172. It then adds two extraneous objects 188 and 190 to its own home page 178, and pads its three real objects to the sizes of the corresponding objects of the home page of the target Web site. Since the home page 178 of the mimicking Web site 170 after the mimicking operation is now indistinguishable in terms of object number and sizes from that home page of the Web site being mimicked, the traffic signature analysis will not be able to tell them apart.

C. Morphing

The third approach tries to make the traffic patterns generated in response to the client's access requests to look different from those expected by the attackers. There are at least six relatively simple methods to accomplish this.

(1) Transmitting Random Chunks

The client (or the Web site) can randomly break one Web page it wants to download into multiple chunks with potentially overlapping ranges. In this case, the client first decides random sizes of a data chunk, and sends a message containing the random chunk sizes to the Web server. The HTTP 1.1 byte-range requests, for example, can be used by the client to specify the sizes of the random chucks it wants the Web server to deliver. The Web server then divide the objects in the Web page into chunks of the specified sizes and send the data chunks to the client. By sending the objects in chunks of random sizes, the real object sizes are effectively completely disguised, and only a (padded) total size of all objects is revealed to the routing nodes on the Internet.

(2) Altering Object Formats

The HTTP content negotiation mechanism, which allows clients and servers to negotiate the format/type of some objects when applicable, can be used to alter traffic patterns. The multiple formats may correspond to encoding of different quality (for images), different languages (for text), etc. Content negotiation can be either server-driven (with the server deciding which format to send, with or without input from the client) or agent-driven (with the server telling the client about the formats available and the client picking one).

(3) Pipelining Object Transmission

HTTP pipelining can be implemented to allow multiple objects to be requested and returned together, so that the boundaries between them (and thus their sizes) are obscured if they are encrypted. After first downloading and parsing the HTML file for a Web page, the client can then issue a pipelined sequence of requests for the embedded objects. The transfer would thus typically happen in two chunks-one corresponding to the HTML and the other corresponding to all of the embedded objects as a group. However, "one-chunk transfer" is possible if a (trusted) proxy first downloads all of the files and then sends them to the client in one chunk.

(4) Prefetching/Pushing Objects

Prefetching/pushing of objects belonging to a particular page that a user will most likely visit effectively removes those objects from the traffic pattern associated with that page. Prefetching/Pushing can be either client-based, with a client browser issuing requests for objects that are not directly requested by the user, or server based, with a Web server proactively pushing content to clients.

(5) Randomly Blocking Objects

A Web advertisement blocker on the user's computer can be extended to randomly block a (possibly varying) subset of the objects that are advertisements. In an example illustrated in FIG. 13, a Web page 200 has multiple objects including some advertisement objects 202, 204, 206. Typically, when the user accesses a Web page, the browser 100 first downloads the HTML document of the page that lists the objects in the page, and then issues HTTP GET requests for downloading the objects. In order to block unwanted advertisements, the advertisement blocker 208 on the client machine 96 uses a customized name resolution file 210, which contains a list 212 of unwanted advertisement sites, to block name resolution for certain sites, thus preventing the browser 100 from issuing HTTP GET requests for objects on those sites.

To prevent an observer of the encrypted Web traffic from identifying the page being downloaded based on its traffic signature, the advertisement blocker 208 is programmed to operate in a privacy protection mode in which it randomly select which advertisement objects in the page 200 are to be blocked. When the user accesses the Web page, the advertisement blocker 208 identifies the advertisement objects of the page by checking the list of advertisements in the name resolution file 210. The advertisement blocker 208 then decides randomly whether or not to block an identified advertisement object. Since not all objects in the page 200 are downloaded to the client, the resultant traffic signature will be different from the traffic signature of the page when all of its objects are downloaded. Because the selection of the advertisement objects for blocking is random, it is difficult for the traffic observer to predict the modified traffic pattern. The effect of random advertisement blocking would likely be similar to that of a limited amount of random-object padding as described above.

(6) Using Multiple Browser Incidences

The user can run multiple browser instances simultaneously, each visiting a different page, so that objects from multiple Web pages interleave with one another. As mentioned above, an observer of the Web traffic may assume that objects in the traffic that form an identifiable batch belong to the same Web page. This assumption is typically correct if the user uses only one browser to consecutively access different pages. It is, however, no longer valid if the user's machine has multiple browsers that try to access multiple Web pages at the same time. If the objects of one page are mixed with objects of another page (or even the same page but accessed by a different browser instance) in the traffic, it will be difficult for the traffic observer to tell which objects in the traffic belong to the same page. As a result, the observer cannot reliably identify the traffic signature of either page being downloaded.

Figure 14:
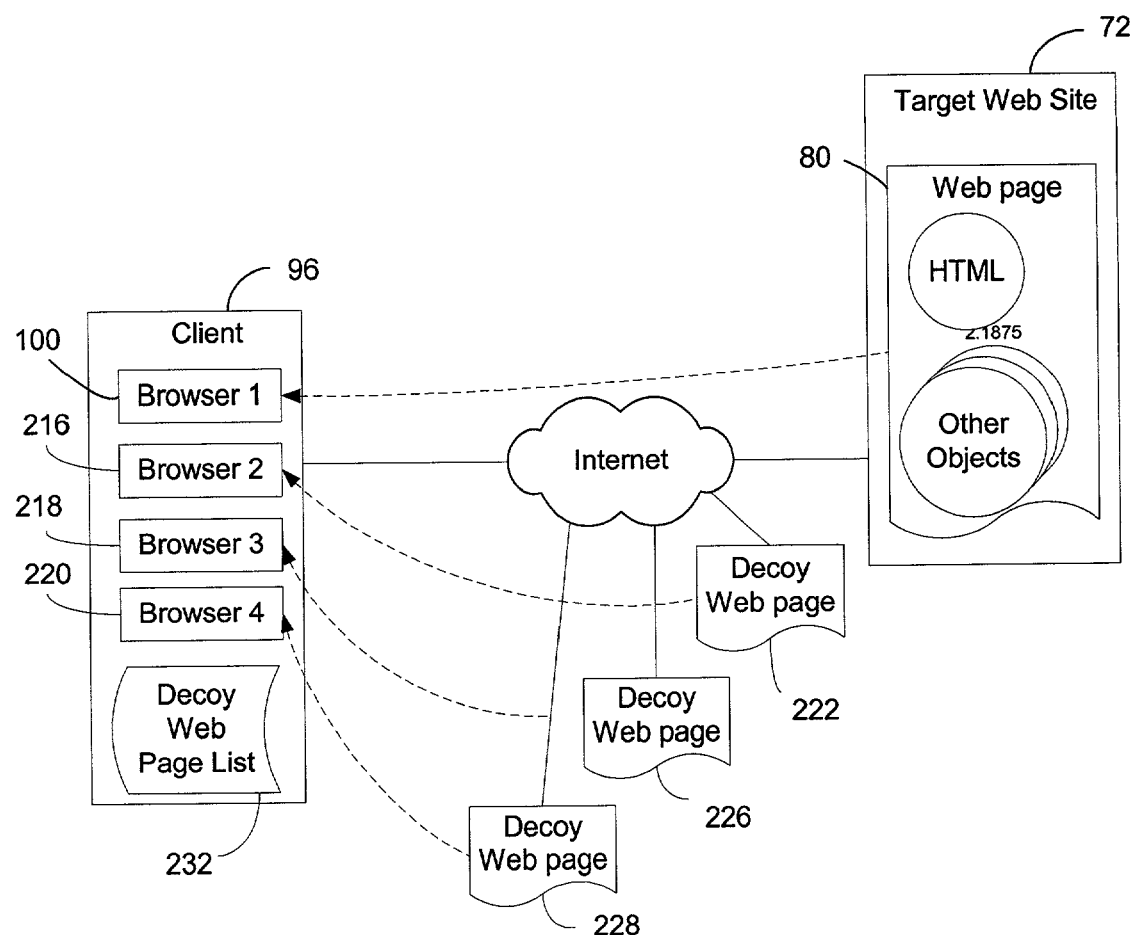
FIG. 14 is a schematic diagram illustrating a scheme of using multiple browser instances to simultaneously access Web pages to mix objects of multiple pages in the download traffic.

Referring now to FIG. 14, in one implementation of this countermeasure, when the user selects to activate the privacy protection function, multiple browser incidences 216, 218, and 220 are automatically launched in addition to the browser incidence 100 actually used by the user. When the user accesses a Web page 80 (such as by clicking on an icon or selecting a URL), the other browsers also send out requests for accessing Web pages 222, 226, and 228, which are preferably randomly selected for an existing list 232. Because the object downloading are requested by the browsers at substantially the same time, the objects of the pages downloaded by the different browsers are likely to be mixed or interleaved in the traffic directed to the user's machine. As a result, an observer of the traffic sees a large batch of mixed objects from various pages and cannot easily pick out the objects from the page the user is actually accessing.

Experiments have shown that the pipelined "two-chunk" delivery scheme implementable under HTTP/1.1 is not overwhelmingly effective, allowing a 36% unique identifiability rate for the target set. It is also possible that this kind of pipelining could result in more than two chunks of data being fetched, since a page may contain objects from multiple sites, which have to be fetched in separate chunks.

Figure 15:
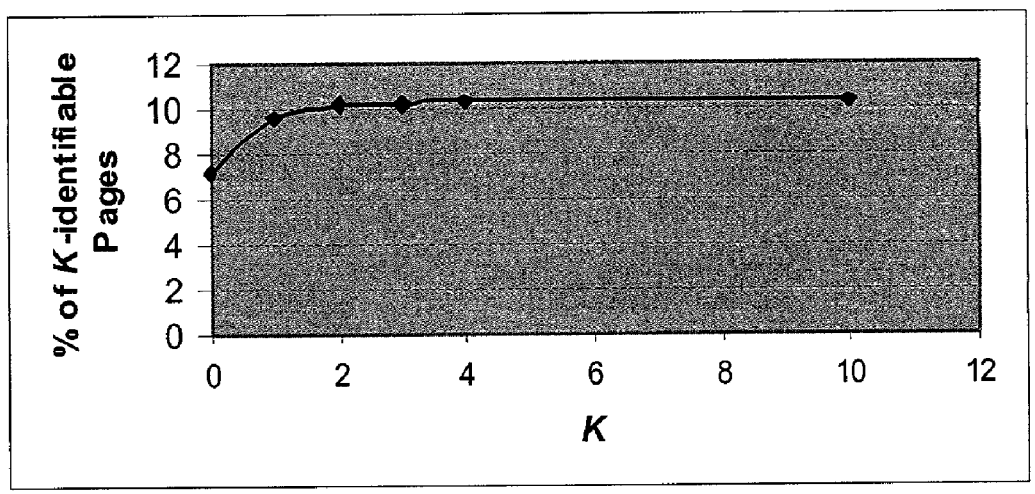
FIG. 15 is a chart representing results of a study according to the invention and showing how the K-identifiability rate changes as a function of the number of potential false-positives under a "one-chunk" delivery scheme for preventing source identification.

On the other hand, techniques that reveal only total page size suffice to make page identification extremely difficult. As FIG. 15 shows, collapsing Web pages in the target set into a single object (with a single size) reduces the unique identifiability rate to 7%, with a further 3% of sites nearly uniquely identifiable. Allowing a tolerance of 128 bytes in either direction when matching lengths (roughly equivalent to a 256-byte padding scheme) results in almost every page having at least one potential false positive, with over 97% having at least ten of them. "One-chunk" pipelining and byte-range requests can thus both be expected to achieve this level of success.

The above countermeasures are all associated with extra costs, which may in some extreme cases make them prohibitively expensive or inconvenient to implement. Some techniques require only features that are part of the HTTP/1.1 standard, but are often not fully implemented in popular client or server software. For example, byte-range requests require both client and server support, but the necessary server support consists only of full implementation of the feature according to the HTTP/1.1 standard, whereas the client requires implementation of the request-generation mechanism. Byte range requests also do not require special content manipulation, unlike, say, mimicking, which requires content to be tailored to match the signature of some other site. Also, padding of some object sizes may require only content adjustment (such as adding "filler" comments to HTML objects), while some object types may require client cooperation to remove the padding. The server without any special client support, on the other hand, can always add hidden objects. In either case, though, extra bandwidth has to be used for its transmission.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

What is claimed is:

1. A computer-readable medium having computer-executable instructions for a Web server to perform steps comprising:
   receiving a request from a client to access a Web page, the Web page having a plurality of objects;
   padding each object of the Web page to reach a size selected from a set of exponentially increasing target sizes;
   encrypting the padded objects of the Web page; and
   transmitting the encrypted and padded objects to the client.

2. A method for a Web server to transmit encrypted Web traffic to a client, comprising:
   receiving a request from the client to access a Web page, the Web page having a plurality of objects;
   padding each object of the Web page to reach a size selected from a set of exponentially increasing target sizes;
   encrypting the padded objects of the Web page; and
   transmitting the encrypted and padded objects to the client.

3. A computer-readable medium having computer-executable instructions for a Web server to perform steps comprising:
   receiving a request from a client to access a Web page, the Web page having a plurality of objects;
   creating objects;
   padding each of the objects of the Web page and the created objects to reach a size selected from a set of increasing target sizes;
   encrypting the padded objects; and
   transmitting the encrypted and padded objects to the client.

4. A computer-readable medium as in claim 3, wherein the step of creating creates objects having randomly selected sizes.

5. A method for a Web server to transmit encrypted Web traffic to a client, comprising:
   receiving a request from the client to access a Web page, the Web page having a plurality of objects;
   creating objects;
   padding each of the objects of the Web page and the created objects to reach a size selected from a set of increasing target sizes;
   encrypting the padded objects; and
   transmitting the encrypted and padded objects to the client.

6. A method as in claim 5, wherein the step of creating creates objects having randomly selected sizes.

7. A computer-readable medium having computer-executable instructions for a Web server to perform steps comprising:
   accessing a Web page to be mimicked to identify a number of objects and sizes of said objects of the Web page to be mimicked;
   receiving a request from a client to access a requested Web page of the Web server, the requested Web page having a plurality of objects;
   creating objects such that a total number of objects of the requested Web page and the created objects equals to a number of objects of the Web page to be mimicked;
   padding the objects of the requested Web page and the created objects to reach sizes of corresponding objects of the Web page to be mimicked;
   encrypting the padded objects; and
   transmitting the encrypted and padded objects to the client.

8. A method for a Web server to transmit encrypted Web traffic to a client, comprising:
   accessing a Web page to be mimicked to identify a number of objects and sizes of said objects of the Web page to be mimicked;
   receiving a request from the client to access a requested Web page of the Web server, the requested Web page having a plurality of objects;
   creating objects such that a total number of objects of the requested Web page and the created objects equals to a number of objects of the Web page to be mimicked;

padding the objects of the requested Web page and the created objects to reach sizes of corresponding objects of the Web page to be mimicked;

encrypting the padded objects; and transmitting the encrypted and padded objects to the client.

* * * * *